United States Patent
Yang et al.

(10) Patent No.: US 10,696,842 B2
(45) Date of Patent: Jun. 30, 2020

(54) POLYMER BLEND COMPOSITION FOR ELECTRONIC COMMUNICATION DEVICES

(71) Applicant: SABIC Global Technologies B.V., Bergen op Zoom (NL)

(72) Inventors: Yuzhen Yang, Evansville, IN (US); Hao Zhou, Newburgh, IN (US); Robert Russell Gallucci, Mt. Vernon, IN (US); Shreyas Chakravarti, Evansville, IN (US); Pooja Bajaj, Schenectady, NY (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 25 days.

(21) Appl. No.: 15/746,218

(22) PCT Filed: Jul. 21, 2016

(86) PCT No.: PCT/US2016/043268
§ 371 (c)(1),
(2) Date: Jan. 19, 2018

(87) PCT Pub. No.: WO2017/015434
PCT Pub. Date: Jan. 26, 2017

(65) Prior Publication Data
US 2018/0215916 A1    Aug. 2, 2018

Related U.S. Application Data

(60) Provisional application No. 62/196,034, filed on Jul. 23, 2015.

(51) Int. Cl.
*C08L 69/00* (2006.01)
*C08L 67/02* (2006.01)
*C08L 83/04* (2006.01)
*C08G 77/448* (2006.01)

(52) U.S. Cl.
CPC .............. *C08L 69/00* (2013.01); *C08L 67/02* (2013.01); *C08L 83/04* (2013.01); *C08G 77/448* (2013.01); *C08L 2201/08* (2013.01); *C08L 2203/20* (2013.01); *C08L 2205/02* (2013.01); *C08L 2205/03* (2013.01); *C08L 2205/035* (2013.01); *C08L 2205/06* (2013.01); *C08L 2207/53* (2013.01)

(58) Field of Classification Search
None
See application file for complete search history.

(56) References Cited

U.S. PATENT DOCUMENTS

| 7,786,246 B2 | 8/2010 | Jansen et al. |
| 2007/0129506 A1 | 6/2007 | Shi et al. |
| 2009/0105393 A1 | 4/2009 | Jansen et al. |
| 2013/0317142 A1* | 11/2013 | Chen ................ C08L 71/12 524/116 |
| 2013/0317150 A1 | 11/2013 | Wan et al. |

FOREIGN PATENT DOCUMENTS

| CN | 101356232 A | 1/2009 |
| CN | 101889041 A | 11/2010 |
| CN | 102227473 A | 10/2011 |
| CN | 103282433 A | 9/2013 |
| KR | 10-2013-0125358 A | 11/2013 |
| WO | WO 2012/058821 A1 | 5/2012 |

OTHER PUBLICATIONS

International Patent Application No. PCT/US2016/043268; Int'l Written Opinion and the Search Report; dated Sep. 30, 2016; 10 pages.
International Patent Application No. PCT/US2016/043268; Int'l Preliminary Report on Patentability; dated Feb. 1, 2018; 9 pages.

* cited by examiner

*Primary Examiner* — Ana L. Woodward
(74) *Attorney, Agent, or Firm* — BakerHostetler

(57) ABSTRACT

Compositions formed from a blend of polycarbonate/siloxane copolymer, polycarbonate, and polycyclohexylenedimethylene terephthalate are disclosed that provide superior performance in terms of notched Izod impact, glass transition temperature (Tg), strength after aging, ability to withstand secondary processing conditions, and in other respects. Such compositions exceed critical-to-quality requirements for use in manufacturing components for electronic communication devices.

19 Claims, No Drawings

POLYMER BLEND COMPOSITION FOR ELECTRONIC COMMUNICATION DEVICES

CROSS-REFERENCE TO RELATED APPLICATIONS

This application is the National Stage of International Application No. PCT/US2016/043268, filed Jul. 21, 2016, which claims the benefit of U.S. Provisional Application No. 62/196,034, filed Jul. 23, 2015, the disclosures of which are incorporated herein by this reference in their entireties.

TECHNICAL FIELD

The present disclosure relates to polymer blend compositions that are compatible with devices that engage in electronic communication.

BACKGROUND

Materials for use in constructing electronic communication devices, especially the antenna component, should be able to protect the underlying electronics while permitting signal transmission without significant loss thereof through such materials. Such materials should also possess certain performance characteristics. According to device manufacturers and other end users, the next generation of materials should have a notched Izod impact rating of at least 650 J/m, should be capable of withstanding secondary processing conditions that can include temperatures up to 100° C., and should pass relevant strength-after-aging tests.

The conventional benchmark grade for such uses is made from a blend of polybutylene terephthalate (PBT) and polycarbonate (PC) with glass fiber. However, this material has an impact rating of about 150 J/m and low glass transition (Tg) of 90.2° C., which means that it is incapable of meeting next generation requirements.

Accordingly, there remains a need for compositions that provide high performance in terms of electronic signal transmission, and that also possess the performance characteristics required for use in communications devices.

SUMMARY

Provided herein are polymer blend compositions comprising 10-30% by weight polycarbonate/siloxane copolymer; 0.5-55% by weight polycarbonate; and, 15-75% by weight polycyclohexylenedimethylene terephthalate (PCT). Also disclosed are articles, including antennas and antenna devices, that comprise such polymer blend compositions.

The present disclosure also relates to methods for forming a polymer blend composition comprising combining 10-30% by weight polycarbonate/siloxane copolymer, 0.5-55% by weight polycarbonate, and 15-75% by weight polycyclohexylenedimethylene terephthalate (PCT); and, extruding the combination to form the composition. Also provided are articles comprising a polymer blend composition that is formed according to such methods.

DETAILED DESCRIPTION OF ILLUSTRATIVE EMBODIMENTS

It is to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves, methods for preparing such compositions, and items made from the compositions. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt. %," and "wt. %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

As used herein, the terms "weight average molecular weight" or "Mw" can be used interchangeably, and are defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

All cited patents, patent applications, and other references are incorporated herein by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The present disclosure provides polymer blend compositions comprising 10-30% by weight polycarbonate/siloxane copolymer; 0.5-55% by weight polycarbonate; and, 15-75% by weight polycyclohexylenedimethylene terephthalate (PCT).

Conventionally, a blend of polybutylene terephthalate and polycarbonate with glass fibers has represented the benchmark grade material for use in constructing electronic communication devices and components thereof, including antennas. As noted above, however, the conventional blend fails to meet the critical-to-quality standard for next generation uses. The present inventors have surprisingly discovered that compositions formed from a blend of polycarbonate/siloxane copolymer, polycarbonate, and polycyclohexylenedimethylene terephthalate can provide superior performance in terms of notched Izod impact, glass transition temperature (Tg), strength after aging, ability to withstand secondary processing conditions, and in other respects.

Polycarbonate Polymer

The present polymer blend compositions can include 0.5 to 55 wt % of polycarbonate polymer. The terms "polycarbonate" or "polycarbonates" as used herein includes copolycarbonates, homopolycarbonates and (co)polyester carbonates.

The term polycarbonate can be further defined as compositions have repeating structural units of the formula (1):

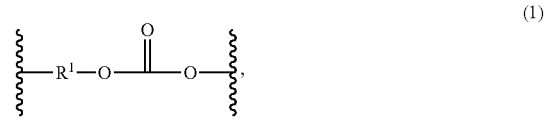

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

-$A^1$-$Y^1$-$A^2$-   (2), wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of the same.

In one aspect, a polycarbonate polymer as disclosed herein can be an aliphatic-diol based polycarbonate. In another aspect, the polycarbonate polymer can comprise a carbonate unit derived from a dihydroxy compound, such as, for example, a bisphenol that differs from the aliphatic diol. In still further aspects, an exemplary polycarbonate polymer includes aromatic polycarbonates conventionally manufactured through a transesterification reaction of an one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1- phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl) sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3 ',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl) fluorene. Combinations comprising at least one dihydroxy aromatic compound can also be used. In another aspect, other types of diols can be present in the polycarbonate.

In a yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear polycarbonates and branched polycarbonates can be used.

The polycarbonate polymer can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the polycarbonate does not comprise a separate polymer such as a polyester. In one aspect, an aliphatic-based polycarbonate comprises aliphatic units that are either aliphatic carbonate units derived from aliphatic diols, or a combination of aliphatic ester units derived from aliphatic diacids having greater than 13 carbons.

The polycarbonate component of the instant polymer blend compositions may be present in an amount from 0.5-55% by weight. In another aspect, the polycarbonate is present in an amount from 5 wt % to 55 wt %. In a yet further aspect, the polycarbonate is present in an amount from 15 wt % to 55 wt %. In another aspect, the polycarbonate is present in an amount of 15 wt % to 35 wt %. In another aspect, the polycarbonate is present in an amount of about 1 wt %, about 10 wt %, about 15 wt %, about 18 wt %, about 25 wt %, about 35 wt %, about 40 wt %, about 45 wt %, or about 50 wt %.

The polycarbonate component may have a molecular weight of about 15,000 to about 50,000. For example, the molecular weight of the polycarbonate component may be about 15,000, about 16,000, about 18,000, about 20,000, about 22,000, about 24,000, about 26,000, about 28,000, about 30,000, about 32,000, about 34,000, about 36,000, about 38,000, about 40,000, about 42,000, about 44,000, about 46,000, or about 48,000.

In some embodiments, the polycarbonate contains no more than 20 ppm phenol end groups. For example, the polycarbonate may contain less than 19 ppm, less than 18 ppm, less than 17 ppm, less than 16 ppm, less than 14 ppm, less than 12 ppm, less than 10 ppm, less than 8 ppm, less than 6 ppm, less than 5 ppm, less than 4 ppm, less than 3 ppm, less than 2 ppm, less than 1 ppm, or no phenol end groups.

In some embodiments, the polycarbonate contains no more than 100 ppm of bromine and chlorine (i.e., the combined amount of bromine and chlorine is no more than 100 ppm). For example, the polycarbonate may contain less than 90 ppm, less than 80 ppm, less than 75 ppm, less than 70 ppm, less than 60 ppm, less than 50 ppm, less than 40 ppm, less than 30 ppm, less than 25 ppm, less than 20 ppm, less than 15 ppm, less than 10 ppm, less than 5 ppm, less than 2 ppm, or no bromine and chlorine.

Polycarbonate-Siloxane Copolymer

As used herein, the term "polycarbonate-siloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. In certain embodiments, the polycarbonate block can be as described above. The polysiloxane-polycarbonate copolymer comprises polydiorganosiloxane blocks comprising structural units of the general formula (3) below:

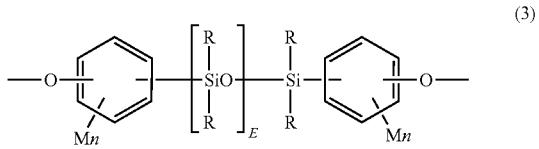

(3)

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (4) below:

(4)

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same. One exemplary polycarbonate-siloxane copolymer is C9030P (General Electric Co.), which contains 20% siloxane segments by weight.

The polycarbonate-siloxane copolymer component of the instant polymer blend compositions may be present in an amount from 10-30% by weight. In another aspect, the polycarbonate-siloxane copolymer is present in an amount from 15 wt % to 25 wt %. In a yet further aspect, the polycarbonate-siloxane copolymer is present in an amount from 17 wt % to 23 wt %. In another aspect, the polycarbonate is present in an amount of 18 wt % to 21 wt %. In another aspect, the polycarbonate is present in an amount of about 15 wt %, about 16 wt %, about 17 wt %, about 18 wt %, about 19 wt %, about 20 wt %, about 21 wt %, about 22 wt %, about 23 wt %, about 24 wt %, or about 25 wt %.

The polycarbonate-siloxane copolymer component may have a molecular weight of about 15,000 to about 50,000. For example, the molecular weight of the polycarbonate-siloxane copolymer component may be about 15,000, about 16,000, about 18,000, about 20,000, about 22,000, about 24,000, about 26,000, about 28,000, about 30,000, about 32,000, about 34,000, about 36,000, about 38,000, about 40,000, about 42,000, about 44,000, about 46,000, or about 48,000.

In some embodiments, the polycarbonate-siloxane copolymer contains no more than 20 ppm phenol end groups. For example, the polycarbonate-siloxane copolymer may contain less than 19 ppm, less than 18 ppm, less than 17 ppm, less than 16 ppm, less than 14 ppm, less than 12 ppm, less than 10 ppm, less than 8 ppm, less than 6 ppm, less than 5 ppm, less than 4 ppm, less than 3 ppm, less than 2 ppm, less than 1 ppm, or no phenol end groups.

In some embodiments, the polycarbonate-siloxane copolymer contains no more than 100 ppm of bromine and chlorine (i.e., the combined amount of bromine and chlorine is no more than 100 ppm). For example, the polycarbonate-siloxane copolymer may contain less than 90 ppm, less than 80 ppm, less than 75 ppm, less than 70 ppm, less than 60 ppm, less than 50 ppm, less than 40 ppm, less than 30 ppm, less than 25 ppm, less than 20 ppm, less than 15 ppm, less than 10 ppm, less than 5 ppm, less than 2 ppm, or no bromine and chlorine.

Polycyclohexylenedimethylene Terephthalate

The presently disclosed polymer blend compositions include polycyclohexylenedimethylene terephthalate (PCT), which has the following formula:

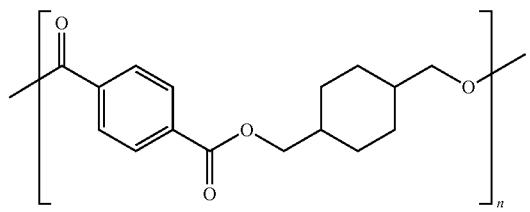

The PCT component may be present in the instant polymer blends in an amount of 15 wt % to 75 wt %. In another aspect, the PCT is present in an amount of 15 wt % to 70 wt %. In a further aspect, the PCT is present in an amount of 20 wt % to 55 wt %. In yet another aspect, the PCT is present in an amount of 30 wt % to 55 wt %. In another aspect, the PCT is present in an amount of about 15 wt %, about 17 wt %, about 20 wt %, about 25 wt %, about 30 wt %, about 33 wt %, about 35 wt %, about 40 wt %, about 45 wt %, about 50 wt %, about 55 wt %, about 65 wt %, about 70 wt %, or about 75 wt %.

The PCT component may have a molecular weight of about 15,000 to about 50,000. For example, the molecular weight of the PCT component may be about 15,000, about 16,000, about 18,000, about 20,000, about 22,000, about 24,000, about 26,000, about 28,000, about 30,000, about 32,000, about 34,000, about 36,000, about 38,000, about 40,000, about 42,000, about 44,000, about 46,000, or about 48,000.

In some embodiments, the PCT component contains no more than 60 meq/kg of carboxyl end groups. For example, the PCT component may contain less than 55 meq/kg, less than 50 meq/kg, less than 45 meq/kg, less than 40 meq/kg, less than 35 meq/kg, less than 30 meq/kg, less than 25 meq/kg, less than 20 meq/kg, less than 15 meq/kg, less than 10 meq/kg, less than 5 meq/kg, less than 3 meq/kg, less than 2 meq/kg, less than 1 meq/kg, or no carboxyl end groups.

Additional Components

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition.

The additive composition can include a chain extender, flow modifier, antioxidant, heat stabilizer, light stabilizer, ultraviolet (UV) light stabilizer, UV absorbing additive, UV reflectant, plasticizer, lubricant, release agent (such as a mold release agent), antistatic agent, anti-fog agent, quenching agent (e.g., transesterification quenching agent), corrosion inhibitor, antimicrobial agent, colorant (e.g., a dye or pigment), surface effect additive, radiation stabilizer, flame retardant, anti-drip agent, or a combination comprising one or more of the foregoing. For example, any combination of a chain extender, heat stabilizer, impact modifier, ultraviolet light absorber, corrosion inhibitor, transesterification quenching agent can be used. In general, the additives are used in the amounts generally known to be effective. For example, the total amount of all of the additives in the polymer blend composition can be 0.001 to 12 wt % each based on the total weight of the composition.

Exemplary quenching agents include phosphorous containing acids, acid salts of a phosphorous containing acid, or any combination thereof. Acid salts of a phosphorous containing acid can include those having a sodium, potassium, lithium, calcium, magnesium, aluminum, or zinc cation, or any combination thereof.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Inorganic flame retardants can also be used, for example salts of C1-16 alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

The presently disclosed compositions may include one or more fillers. Fillers include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Certain fillers act as reinforcing agents. Fillers are used in amounts of 1 to 200 parts by weight, based on 100 parts by weight of based on 100 parts by weight of the total composition.

The present polymer blend compositions can include an impact modifier, if desired. Impact modifiers may be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers. The particle sizes of the impact modifiers may be from about 100 nm to about 1000 nm. In certain embodiments, the particle size of the impact modifier is 100 nm to 800 nm, 100 nm to 700 nm, 100 nm to 600 nm, 100 nm to 500 nm, 200 nm to 500 nm, 200 nm to 400 nm, 250 nm to 350 nm, or about 300 nm.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), styrene-acrylonitrile (SAN), ethylene-acrylic ester-glycidyl methacrylate (e.g., ethylene-ethyl acrylate-glycidyl methacrylate), natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, high rubber graft (HRG), and the like. Some suitable impact modifies include PC (polycarbonate)/ABS (such as Cycoloy PC/ABS) and MBS type formulations.

In certain embodiments, the present polymer blend compositions comprise a transesterification quencher, 0.1 to 1.0 wt % of a benzotriazole ultraviolet light absorber having a molecular weight of greater than 200, 0.1 to 10 wt % of silane-passivated $TiO_2$ having an average particle size of 1-8 microns, and 1-15 wt % of core shell copolymer impact modifier having an average particle size of 200-400 nm.

The present disclosure also relates to methods for forming a polymer blend composition comprising combining 10-30% by weight polycarbonate/siloxane copolymer, 0.5-55% by weight polycarbonate, and 15-75% by weight polycyclohexylenedimethylene terephthalate (PCT); and, forming the composition from the combination. For example, the composition may be formed by extruding the combination.

The polymer compositions can be formed by techniques known to those skilled in the art. Extrusion and mixing techniques, for example, may be utilized to combine the components of the polymer composition.

The polymer blend compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods, including batch or continuous techniques that employ kneaders, extruders, mixers, and the like. For example, the composition can be formed as a melt blend employing a twin-screw extruder. In some embodiments at least some of the components are added sequentially. For example, the polycarbonate component and the impact modifier component, can be added to the extruder at the feed throat or in feeding sections adjacent to the feed throat, or in feeding sections adjacent to the feed throat, while the flame retardant component can be added to the extruder in a subsequent feeding section downstream. Alternatively, the sequential addition of the components may be accomplished through multiple extrusions. A composition may be made by preextrusion of selected components, such as the polycarbonate component and the impact modifier component to produce a pelletized mixture. A second extrusion can then be employed to combine the preextruded components with the remaining components. The flame retardant component can be added as part of a masterbatch or directly. The extruder can be a two lobe or three lobe twin screw extruder.

As disclosed in the Examples that follow, the presently disclosed compositions possess advantageous physical properties and resistance to degradation, among other advantageous characteristics. In some embodiments, the polymer blend compositions have a glass transition temperature (Tg) of about 95 to about 150° C. For example, the Tg of the present compositions may be about 98 to about 150° C., about 100 to about 145° C., about 100 to about 140° C., about 110 to about 140° C., about 120 to about 140° C., or about 120 to about 130° C. The present polymer blend compositions may have a notched impact Izod rating of at least 400 J/m, such as about 400 J/m, about 450 J/m, about 500 J/m, about 550 J/m, about 600 J/m, about 650 J/m, about 700 J/m, or about 750 J/m. In certain embodiments, the polymer blend compositions have an as-molded tensile elongation at break of at least 30%. For example, the as-molded tensile elongation at break may be at least 32%, 35%, 36%, 38%, 40%, 42%, 44%, 45%, 46%, 48%, or 50%. The polymer blend compositions may have an as-molded tensile elongation at break of at least 25% after being subjected to banana boat sunscreen aging test conditions (either three days or five days). For example, the as-molded tensile elongation at break may be at least 5%, 10%, 15%, 20%, 25%, 30%, 35%, 40%, 45%, or 50% after being subjected to banana boat sunscreen aging test conditions.

In one aspect, the present disclosure pertains to articles, for example, that have been shaped, formed, or molded at least in part from the compositions described herein. Also provided are articles comprising a polymer blend composition that is formed according to the presently disclosed methods for forming a polymer blend composition. The instant compositions can be molded into useful shaped articles by a variety of means such as injection molding, extrusion, rotational molding, blow molding and thermoforming to form articles. The compositions described herein can also be made into film and sheet as well as components of laminate systems.

In a further aspect, the article comprising the disclosed compositions may be used in computer and business machine housings such as housings for monitors, handheld electronic device housings such as housings for cell phones, antenna coatings, covers, sheaths, or housings, electrical connectors, and medical devices that utilize electronic communication, or any other device that utilizes wireless electronic communication. Other representative articles that may be fabricated using the disclosed copolymer compositions provided herein include parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; and like applications.

Aspects

In various aspects, the present disclosure pertains to and includes at least the following aspects.

Aspect 1. A polymer blend composition comprising:
10-30% by weight polycarbonate/siloxane copolymer;
0.5-55% by weight polycarbonate; and,
15-75% by weight polycyclohexylenedimethylene terephthalate (PCT),
wherein the polycarbonate/siloxane copolymer and the polycarbonate both independently have a molecular weight of 15,000 to 50,000, and both independently contain no more than 20 ppm phenol end groups and no more than 100 ppm bromine and chlorine, and
wherein the PCT has a molecular weight of 15,000 to 50,000 and contains no more than 60 meq/kg of carboxyl end groups.

Aspect 2. The composition according to aspect 1 comprising 15-25% by weight polycarbonate/siloxane copolymer.

Aspect 3. The composition according to aspect 1 or aspect 2 comprising 15-40% by weight polycarbonate.

Aspect 4. The composition according to any one of aspects 1-3 comprising 30-55% by weight PCT.

Aspect 5. The composition according to any one of aspects 1-4 comprising about 50% by weight PCT.

Aspect 6. The composition according to aspect 5 comprising about 20% by weight polycarbonate/siloxane copolymer and about 18% by weight polycarbonate.

Aspect 7. The composition according to any one of aspects 1-6 further comprising an antioxidant, antistatic agent, chain extender, de-molding agent, flow modifier, light stabilizer, lubricant, mold release agent, pigment, quenching agent, heat stabilizer, a ultraviolet light absorber, ultraviolet reflectant substance, and ultraviolet stabilizer, or any combination thereof.

Aspect 8. The composition according to any one of aspect 1-7 further comprising a heat stabilizer, an impact modifier, a ultraviolet light absorber, a corrosion inhibitor, a quenching agent, or any combination thereof.

Aspect 9. The composition according to aspect 8 comprising a quenching agent that is a phosphorous containing acid, an acid salt of a phosphorous containing acid, or any combination thereof.

Aspect 10. The composition of aspect 8 comprising a quenching agent that is an acid salt of a phosphorous containing acid having a cation that is sodium, potassium, lithium, calcium, magnesium, aluminum, zinc, or any combination thereof.

Aspect 11. The composition according to any one of aspect 1-7 further comprising a transesterification quencher, 0.1 to 1.0 wt % of a benzotriazole ultraviolet light absorber having a molecular weight of greater than 200, 0.1 to 10 wt % of silane-passivated TiO2 having an average particle size of 1-8 microns, and 1-15 wt % of core shell copolymer impact modifier having an average particle size of 200-400 nm.

Aspect 12. The composition according to any one of aspect 1-11 having a glass transition temperature of 100-150° C., a notched Izod impact rating of at least 400 J/m, an as-molded tensile elongation at break of at least 50%, and an as-molded tensile elongation at break of at least 25% after being subjected to banana boat sunscreen aging test conditions.

Aspect 13. An article comprising the composition according to any one of aspects 1-12.

Aspect 14. The article according to aspect 13, wherein said article is antenna device, or an antenna coating, cover, or sheath.

Aspect 15. A method for making a polymer blend composition comprising:
combining 10-30% by weight polycarbonate/siloxane copolymer, 0.5-55% by weight polycarbonate, and 15-75% by weight polycyclohexylenedimethylene terephthalate (PCT); and,
extruding said combination to form said composition,
wherein the polycarbonate/siloxane copolymer and the polycarbonate both independently have a molecular weight of 15,000 to 50,000, and both independently contain no more than 20 ppm phenol end groups and no more than 100 ppm bromine and chlorine, and wherein the PCT has a molecular weight of 15,000 to 50,000 and contains no more than 60 meq/kg of carboxyl end groups.

Aspect 16. The method according to aspect 15 comprising combining 15-25% by weight of said polycarbonate/siloxane copolymer, 15-40% by weight of said polycarbonate, and 30-55% by weight polycyclohexylenedimethylene terephthalate (PCT).

Aspect 17. The method according to aspect 15 comprising combining about 20% by weight of said polycarbonate/siloxane copolymer, about 18% by weight of said polycarbonate, and about 50% by weight of said PCT.

Aspect 18. The method according to any one of aspects 15-17 wherein the polymer blend composition further comprises a transesterification quencher, 0.1 to 1.0 wt % of a benzotriazole ultraviolet light absorber having a molecular weight of greater than 200, 0.1 to 10 wt % of silane-passivated $TiO_2$ having an average particle size of 1-8 microns, and 1-15 wt % of core shell copolymer impact modifier having an average particle size of 200-400 nm.

Aspect 19. An article comprising a polymer blend composition that is produced according to the method of any one of aspects 15-18.

Aspect 20. The article according to aspect 19, wherein said article is an antenna device or an antenna coating, cover, or sheath.

EXAMPLES

The following examples are set forth so as to provide those of ordinary skill in the art with a complete disclosure and description of how the methods, additives, compositions, and articles claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is expressed in degrees Celsius or Fahrenheit, or is at ambient temperature, and pressure is at or near atmospheric.

Example 1—Comparative Results for Physical and Mechanical Properties

Materials and Methods

For the data discussed herein the following materials and methods were used. Table 1 describes the components from which the tested polymer blend compositions were made:

TABLE 1

| Item code | Description |
|---|---|
| C149 | POLYCARBONATE RESIN, LEXAN ® ML8131-111N, Mw = 36,500 (PC Stds), Phenolic end group less than 10 ppm, Br and Cl less than 20 ppm |
| C9030P | 20% PC/SILOXANE COPOLYMER, PCP ENDCAPPED, Mw = 30,000 (PC Stds), Phenolic end group less than 10 ppm, Br and Cl less than 20 ppm |
| F963190 | Eastman Polyester 13787 PCT (based on dimethyl terephthalate and diester dimethyl 1,4-cyclohexanedicarboxylate) Mw = 35.000 (PC stds), COOH end groups <20 meq/Kg, IV = 0.77 dl/g, Tm 285 C. |
| F281454 | 10% aqueous Phosphoric Acid |
| F722224 | Styrene-acrylate-epoxy oligomer, JONCRYL ADR 4368 |
| F232 | ACRYLIC CORE SHELL POLYMER IMPACT MODIFIER, average particle size 150 nm |
| F528 | 2-(2'HYDROXY-5-T-OCTYLPHENYL)-BENZOTRIAZOLE, Mw = 323 |
| F542 | PHOSPHITE STABILIZER |
| F174 | HINDERED PHENOL STABILIZER, IRGANOX 1010 |
| F8260 | Mono Zinc Phosphate |
| R107C | Titanium Oxide, particle size less than 1 micron |

Blends of PCT and polycarbonate at different ratios, along with fixed amounts of polycarbonate/siloxane copolymer, were studied and compared with the benchmark grade EXTC2204 in terms of Tg, mechanical properties, and banana boat sunscreen aging test (BBSS) aging performance. Table 2 shows the formulations that were used for these studies, wherein numbers are shown in terms of percentage by weight.

TABLE 2

| Item Code | Item description | Experimental Sample | | | | | | |
|---|---|---|---|---|---|---|---|---|
| | | 1 | 2 | 3 | 4 | 5 | 6 | 7 |
| C149 | LEXAN ML8131-111N | — | 0.94 | 17.73 | 26.16 | 34.68 | 43.02 | 51.46 |
| C9030P | Eastman Polyester 13787 (PCT) -- Unfilled Apps | 88.4 | 67.46 | 50.67 | 42.24 | 33.73 | 25.38 | 16.94 |
| F963190 | PC/SILOXANE COPOLYMER, PCP ENDCAPPED | — | 20 | 20 | 20 | 20 | 20 | 20 |
| F722224 | ADR 4368 (cesa 9900) | 0.25 | 0.25 | 0.25 | 0.25 | 0.25 | 0.25 | 0.25 |
| F232 | ACRYLIC POLYMER IMPACT MODIFIER, PELLETS | 8 | 8 | 8 | 8 | 8 | 8 | 8 |
| F528 | 2-(2'HYDROXY-5-T-OCTYLPHENYL)-BENZOTRIAZOLE | 0.25 | 0.25 | 0.25 | 0.25 | 0.25 | 0.25 | 0.25 |

TABLE 2-continued

| Item | | Experimental Sample | | | | | | |
|---|---|---|---|---|---|---|---|---|
| Code | Item description | 1 | 2 | 3 | 4 | 5 | 6 | 7 |
| F542 | PHOSPHITE STABILIZER | 0.1 | 0.1 | 0.1 | 0.1 | 0.1 | 0.1 | 0.1 |
| F174 | HINDERED PHENOL STABILIZER | 0.1 | 0.1 | 0.1 | 0.1 | 0.1 | 0.1 | 0.1 |
| F8260 | Mono Zinc Phosphate | 0.1 | 0.1 | 0.1 | 0.1 | 0.1 | 0.1 | 0.1 |
| R107C | Titanium Oxide | 2.8 | 2.8 | 2.8 | 2.8 | 2.8 | 2.8 | 2.8 |

Also tested was the conventional, benchmark grade composition comprising a blend of 40% by weight polybutylene terephthalate, 16% by weight polycarbonate, and 30% by weight glass fibers.

Extrusion of the compositions was carried out using a CPP Technology: Lab Lines CL8: 27 mm Twin Screw Extruder, both side and rear fed; 10 Barrel; 40:1 L/D.

To mold the test samples, separate bars for ASTM tensile, Izod, heat deflection temperature (HDT), and flame testing were injection molded on an 80 ton van Dorn molding machine with a set temperature of approximately 285-310° C. The pellets were dried for 3-4 hours at 120° C. in a forced air-circulating oven prior to injection molding. Each type of sample was individually molded. All samples were tested as molded, and there was no annealing.

Melt volume-flow rate (MVR) was tested per ISO 1133 at 300° C. with 5 kg load and 300 s dwell time.

Specific gravity was measured in accordance with ASTM D792.

Notched and un-notched Izod testing were performed on 75 mm×12.5 mm×3.2 mm bars using ASTM method D256 at both 23° C., 0° C., −30° C. using a 5 lbf hammer for notched samples, and 10 lbf hammer for un-notched specimens.

Tensile properties were measured according to ASTM D638 at 23° C. and 5 mm/min speed.

Flexural properties were tested according to ASTM D790 with 3.2 mm thickness specimen and 1.27 mm/min speed.

Heat deflection temperature (HDT) was tested according to ASTM D648 with 1.82 MPa stress on 3.2 mm thickness specimens.

The Dynamic Mechanical Analyzer (DMA) was tested in accordance with ASTM D5026 from 40 to 200° C. on 75 mm×12.5 mm×3.2 mm unnotched Izod bars.

To assess the properties of the compositions following aging, based on customer requirements, the banana boat sunscreen aging test was selected and performed at 65° C. for 72 hr, and at room temperature for 120 hr. Tensile bars (end gated) were molded according to the above-described molding procedure, and three bars were placed into the 1% Strain Jig at specific amount of time depending on the aging temperature. The bars were removed from the oven, wiped clean, and allowed to air dry before tensile testing as described above. The tensile retention properties are reported as a percent differential from the results obtained from an unexposed control sample. Each data point is the average of three samples.

Results

Physical and mechanical properties of the experimental polymer blend compositions (samples 1-7), as compared with those of the control PBT/PC benchmark grade, are shown in Table 3, below.

TABLE 3

| | | Experimental Sample | | | | | | | |
|---|---|---|---|---|---|---|---|---|---|
| | Unit | 1 | 2 | 3 | 4 | 5 | 6 | 7 | Control |
| PCT Content | % | 88.4 | 67.46 | 50.67 | 42.24 | 33.73 | 25.38 | 16.94 | n/a |
| Tg by DMA | ° C. | 97.8 | 109.1 | 118.8 | 121.9 | 129.2 | 131.6 | 135.4 | 90.2 |
| NII @ 23 C. | J/m | 59.8 | 688.9 | 704.9 | 772 | 742.3 | 718 | 726.2 | 150.4 |
| Ductility | % | 0 | 100 | 100 | 100 | 100 | 100 | 100 | 0 |

As shown in Table 3, most of the experimental samples possessed a higher Tg than the 98° C. temperature requirement from the customer's secondary process conditions, with samples 1 and 2 having a Tg of 97.8° C. and 109.1° C., respectively. The samples containing PCT in the amount of 67.46 wt % or less all passed the next generation critical-to-quality notched Izod rating of 650 J/m.

Based on the preceding results, samples 3 through 7 were selected for evaluation under the BBSS aging test. The BBSS aging test was not carried out with respect to sample 2 because the Tg of that sample was borderline to pass the secondary processing temperature requirement, which means that the sample might not be sufficiently robust to withstand such harsh testing conditions for a longer duration. The results of the BBSS aging test and tensile property retention test are shown in Table 4, below.

TABLE 4

| Test | Unit | Experimental Sample 3 | 4 | 5 | 6 | 7 | Control |
|---|---|---|---|---|---|---|---|
| 1% Strain Jig BBSS 65 C. 3 Days | — | No Crack | No Crack | No Crack | Cracked | Cracked | No Crack |
| Tensile Strength @ Yield Retention | % | 113 | 102 | 100 | N/A | N/A | 101 |
| Tensile Elongation @ Break Retention | % | 54 | 32 | 25 | N/A | N/A | 90 |
| 1% Strain Jig BBSS RT 5 Days | MPa | No Crack | No Crack | No Crack | Cracked | Cracked | No Crack |
| Tensile Strength @ Yield Retention | % | 104 | 67 | 86 | N/A | N/A | 112 |
| Tensile Elongation @ Break Retention | % | 46 | 2 | 4 | N/A | N/A | 97 |

Table 4 shows that experimental sample 3 displayed the best tensile property retention among all experimental samples, and passed the both BBSS aging tests (65° C./3 days and room temperature/5 days) without cracking. The conventional PBT/PC sample also displayed good chemical resistance by passing the BBSS aging test. However, as shown in Table 3, the PBT/PC blend possessed a lower Tg and displayed significantly poorer impact than each of the experimental blends. Therefore, the experimental blends showed significantly better performance than the benchmark composition, and meet the CTQ requirements for next generation applications.

What is claimed:

1. A polymer blend composition comprising:
   10-30% by weight polycarbonate/siloxane copolymer;
   0.5-55% by weight polycarbonate; and,
   15-75% by weight of a polycyclohexylenedimethylene terephthalate (PCT) homopolymer,
   wherein the polycarbonate/siloxane copolymer and the polycarbonate both independently have a molecular weight of 15,000 to 50,000, and both independently contain no more than 20 ppm phenol end groups and no more than 100 ppm bromine and chlorine,
   wherein the PCT has a molecular weight of 15,000 to 50,000 and contains no more than 60 meq/kg of carboxyl end groups, and
   wherein the composition has a glass transition temperature of 100-150° C., a notched Izod impact rating of at least 400 J/m, an as-molded tensile elongation at break of at least 50%, and an as-molded tensile elongation at break of at least 25% after being subjected to banana boat sunscreen aging test conditions.

2. The composition according to claim 1 comprising 15-25% by weight polycarbonate/siloxane copolymer.

3. The composition according to claim 1 comprising 15-40% by weight polycarbonate.

4. The composition according to claim 1 comprising 30-55% by weight PCT homopolymer.

5. The composition according to claim 1 comprising about 50% by weight PCT homopolymer.

6. The composition according to claim 5 comprising about 20% by weight polycarbonate/siloxane copolymer and about 18% by weight polycarbonate.

7. The composition according to claim 1 further comprising an antioxidant, antistatic agent, chain extender, demolding agent, flow modifier, light stabilizer, lubricant, mold release agent, pigment, quenching agent, heat stabilizer, a ultraviolet light absorber, ultraviolet reflectant substance, and ultraviolet stabilizer, or any combination thereof.

8. The composition according to claim 1 further comprising a heat stabilizer, an impact modifier, a ultraviolet light absorber, a corrosion inhibitor, a quenching agent, or any combination thereof.

9. The composition according to claim 8 comprising a quenching agent that is a phosphorous containing acid, an acid salt of a phosphorous containing acid, or any combination thereof.

10. The composition of claim 8 comprising a quenching agent that is an acid salt of a phosphorous containing acid having a cation that is sodium, potassium, lithium, calcium, magnesium, aluminum, zinc, or any combination thereof.

11. The composition according to claim 1 further comprising a transesterification quencher, 0.1 to 1.0 wt % of a benzotriazole ultraviolet light absorber having a molecular weight of greater than 200, 0.1 to 10 wt % of silane-passivated TiO2 having an average particle size of 1-8 microns, and 1-15 wt % of core shell copolymer impact modifier having an average particle size of 200-400 nm.

12. An article comprising the composition according to claim 1.

13. The article according to claim 12, wherein said article is an antenna device, or an antenna coating, cover, or sheath.

14. The method according to claim 1 wherein the polymer blend composition further comprises a transesterification quencher, 0.1 to 1.0 wt % of a benzotriazole ultraviolet light absorber having a molecular weight of greater than 200, 0.1 to 10 wt % of silane-passivated TiO2 having an average particle size of 1-8 microns, and 1-15 wt % of core shell copolymer impact modifier having an average particle size of 200-400 nm.

15. A method for making a polymer blend composition comprising:

combining 10-30% by weight polycarbonate/siloxane copolymer, 0.5-55% by weight polycarbonate, and 15-75% by weight polycyclohexylenedimethylene terephthalate (PCT) homopolymer; and, extruding said combination to form said composition, wherein the polycarbonate/siloxane copolymer and the polycarbonate both independently have a molecular weight of 15,000 to 50,000, and both independently contain no more than 20 ppm phenol end groups and no more than 100 ppm bromine and chlorine, wherein the PCT has a molecular weight of 15,000 to 50,000 and contains no more than 60 meq/kg of carboxyl end groups, and wherein the composition has a glass transition temperature of 100-150° C., a notched Izod impact rating of at least 400 J/m, an as-molded tensile elongation at break of at least 50%, and an as-molded tensile elongation at break of at least 25% after being subjected to banana boat sunscreen aging test conditions.

16. The method according to claim 15 comprising combining 15-25% by weight of said polycarbonate/siloxane copolymer, 15-40% by weight of said polycarbonate, and 30-55% by weight polycyclohexylenedimethylene terephthalate (PCT) homopolymer.

17. The method according to claim 15 comprising combining about 20% by weight of said polycarbonate/siloxane copolymer, about 18% by weight of said polycarbonate, and about 50% by weight of said PCT homopolymer.

18. An article comprising a polymer blend composition that is produced according to the method of claim 15.

19. The article according to claim 18, wherein said article is an antenna device or an antenna coating, cover, or sheath.

* * * * *